Patented Apr. 18, 1939

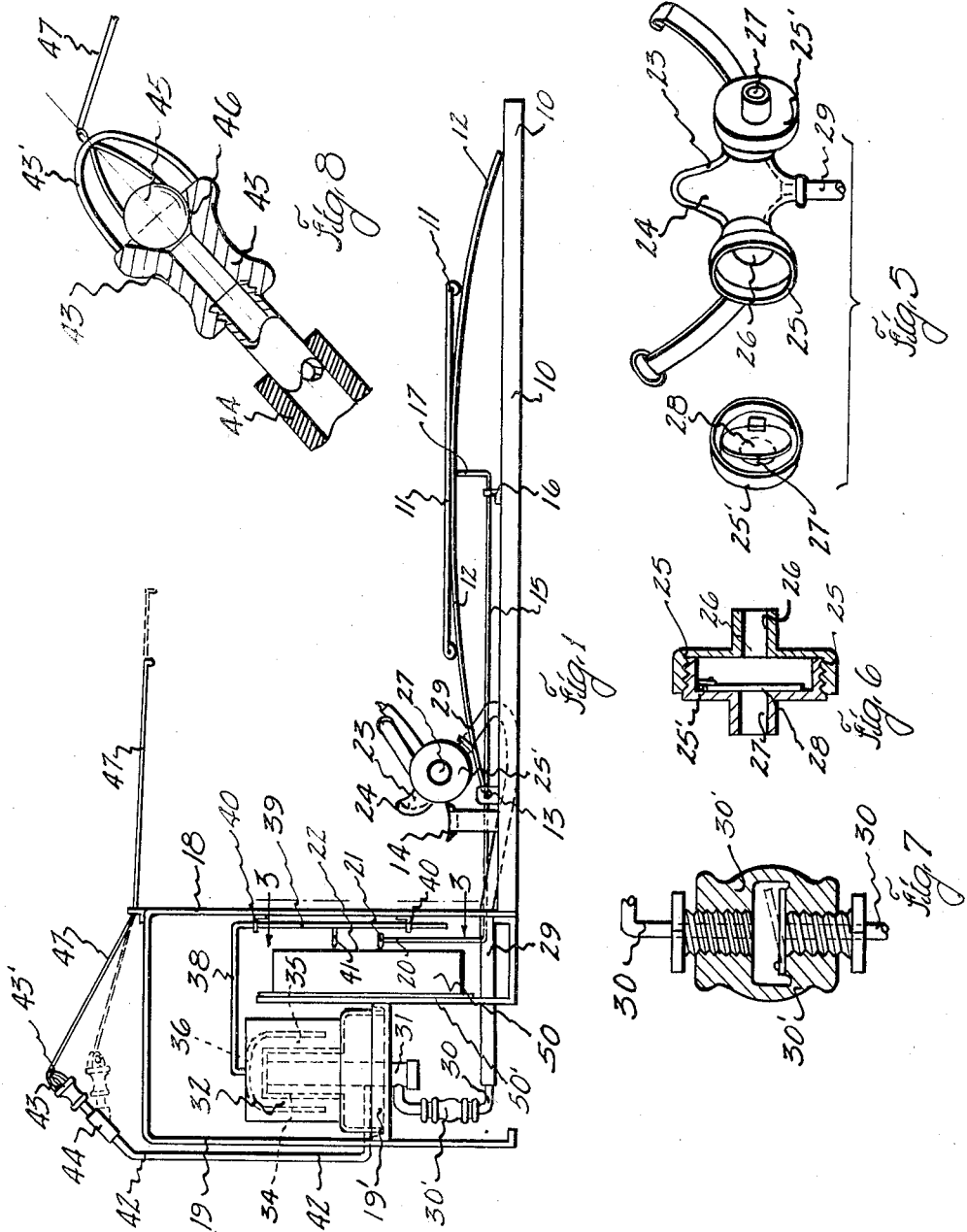

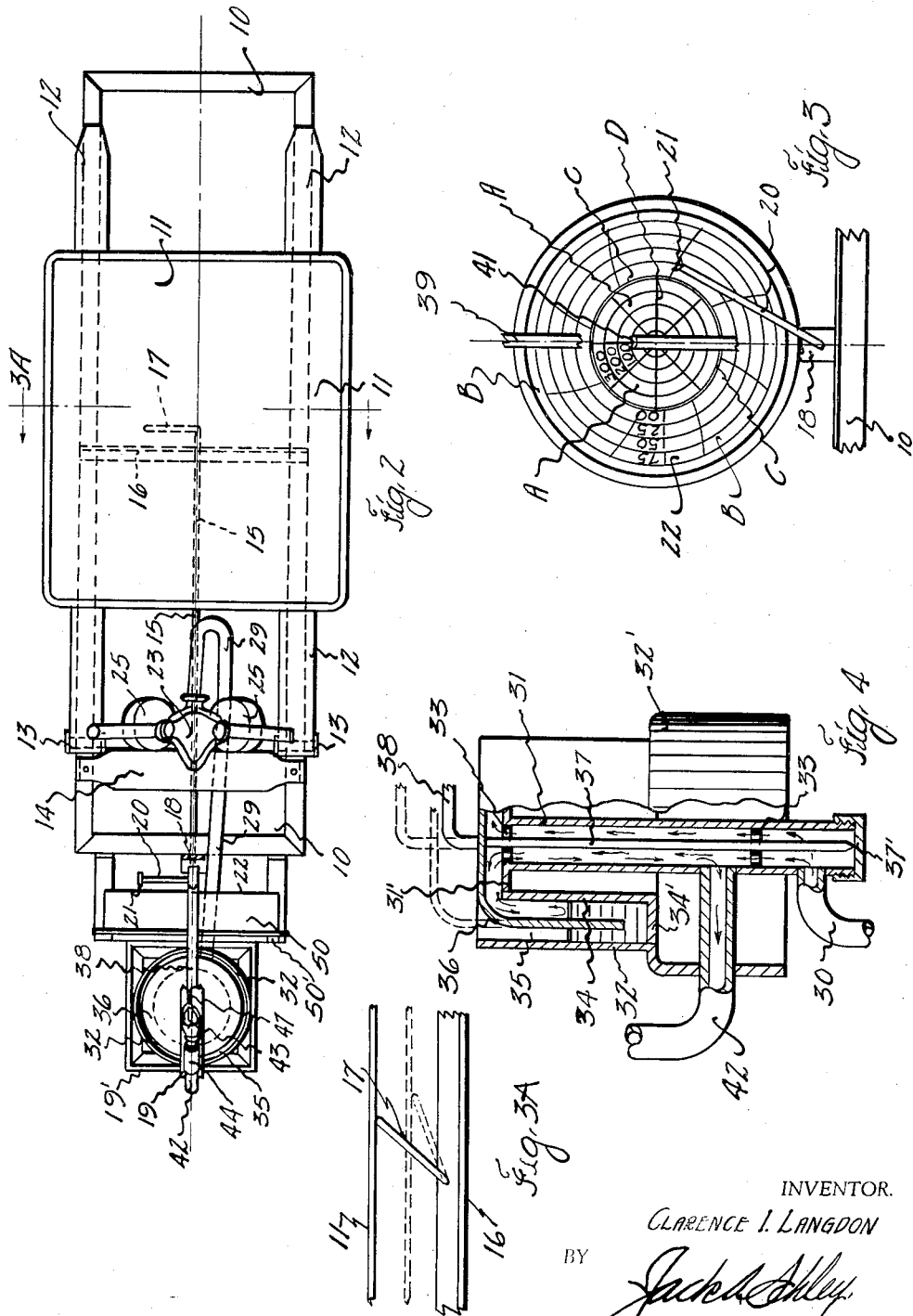

2,155,136

UNITED STATES PATENT OFFICE 2,155,136

METHOD OF AND MEANS FOR RECORDING ARTIFICIAL RESPIRATIONS

Clarence I. Langdon, Dallas, Tex.

Application January 17, 1936, Serial No. 59,499

8 Claims. (Cl. 128—28)

This invention relates to new and useful improvements in methods of and means for recording artificial respirations.

One object of the invention is to provide improved means for visibly recording respirations as applied to a subject or patient, whereby the person applying such respirations is advised, at all times of the results obtained, said means being particularly adapted for use with the Shaefer method of artificial respiration.

An important object of the invention is to provide an improved method for recording artificial respirations, which includes, recording the number of respirations over a given period, recording the pressure applied to the body at each respiration, and then recording the amount of air taken in and expelled at each respiration.

Another object of the invention is to provide an improved apparatus for use in artificial respiration wherein, the number of respirations for a given period, the pressure applied at each respiration, and the air taken in and expelled by the subject at each respiration, are recorded simultaneously on a chart, so that the results of the work are visible, thus making the apparatus adaptable for use in instruction, as well as in actual cases of reviving persons overcome by gas, drowned persons, electrocuted persons, etc.

A further object of the invention is to provide an improved apparatus including yieldable means for supporting a person, and means actuated by said yieldable means for recording the pressure placed on the support, whereby the pressure applied on the body at each respiration is recorded.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a side elevation of an apparatus, constructed in accordance with the invention, Figure 2 is a plan view, Figure 3 is a transverse, vertical sectional view, taken on the line 3—3 of Figure 1, Figure 3A is a detail of the weight indicator rod actuating elements, Figure 4 is a view, partly in elevation and partly in section of the measuring chamber, Figure 5 is an elevation of the mask, having one of the inlet caps removed, Figure 6 is a transverse, vertical sectional view of one of the caps, Figure 7 is a vertical sectional view of the inlet valve for the measuring chamber, and Figure 8 is a sectional view of the release valve.

In the drawings, the numeral 10 designates an elongated frame which preferably has a rectangular shape and which may be constructed of any suitable material. A yieldable platform 11 is supported above the frame on a pair of flat spring members 12 which extend longitudinally of said frame along each side thereof. Each spring member is bowed and its central portion is secured to the platform in any suitable manner. One end of each member 12 is pivoted to an ear 13 which extends upwardly from the frame, the other end of said member resting on said frame. When the patient or subject is placed on the platform, it is obvious that the weight of his body will move the platform downwardly under tension of the supporting spring members. A suitable head rest 14 extends upwardly from frame 10, so that when the patient is placed face down on the platform, his forehead is supported by the rest.

For registering the weight of the body on the platform, and also for recording the pressure applied to said body, an elongated rod 15 extends longitudinally beneath the platform. One end of the rod passes through an angle bracket 16 and is provided with an upwardly bent foot 17. The upper end of this foot engages the underside of the platform and said foot is of such length that when the platform is in a raised position, said foot extends at an angle as is shown in Figure 3A. With such arrangement, depression of the platform will swing the foot, as shown by dotted lines in Figure 3A, to rotate the rod 15.

The other end of the rod passes through a standard 18 of a vertical frame 19, and this end of the rod is bent upwardly upon itself at right angles to form a pointer 20. The upper end of the pointer carries a suitable marking medium, such as lead or chalk, 21, which medium is arranged to engage a chart or dial 22.

The chart is clearly shown in Figure 3 and is provided with a plurality of inner concentric circles A, and a plurality of outer concentric circles B, the two groups of circles being separated by a double line C. The outer group of circles represent weight in pounds. Normally, with the platform 11 in a raised position, the pointer 20 is in a position with its marker 21 resting on the line C. When a body or other weight, is placed on the platform, it is, of course, depressed which action rotates the rod 15. Rotation of the rod will then swing the pointer 20 across the group of circles B. The distance between each circle may designate 50 pounds and thus, since the depression of the platform controls the swing of the lever, it will be seen that the weight on the platform is registered by the pointer. Due to the marking medium 21, each swing of the pointer will cause a mark to be made on the outer group B of circles.

After the body of the patient or subject has been placed on the platform, the pointer will stop at the point on the chart registering the weight on the platform. Then, when artificial respiration is applied to the body, the pressure or weight exerted on the body will further depress the platform which will further swing the pointer a distance corresponding to the weight applied, whereby the pressure exerted will be shown on the chart.

For registering the volume of air taken in and expelled by the patient or subject while artificial respiration is being applied, a mask 23 is provided (Figure 5). The mask includes a hood 24 which is arranged to fit over the nose and mouth of the subject so that he must breathe through the mask. Inlet caps 25 are located at each side of the hood and have openings 26 which register with the interior of said hood. The outer side 25' of each cap is removable and has a central opening 27 therein. A flap valve 28 normally closes this opening. The valve acts as a check valve, being arranged to permit air to enter the cap and hood, but to prevent its escape therefrom through the opening 27.

With the mask in place over the subject's mouth and nose, air is admitted to the hood through the openings 27, the valves 28 being opened upon inhaling, and this air then enters the respiratory channels of the body. The air is expelled from the lungs upon exhaling and the pressure created by the expulsion of this air closes the valves 28, so that escape through the openings 27 is prevented. The expelled air within the hood can escape therefrom only through a flexible conductor 29 which leads from the central portion of the hood 24.

The other end of the conductor is connected with the lower end of a pipe 30 which has its upper end communicating with the lower end of a cylindrical air conduit 31. A suitable check valve 30' is mounted in the pipe 30 so that the air from the flexible conductor may pass upwardly into the conduit 31 but cannot flow from the conduit to the conductor.

The conduit extends axially through a cylindrical housing 32 having an enlarged skirt 32' which is supported in a horizontal frame 19', suitably fastened within the frame 19 at the proper elevation. The upper end of the conduit 31 terminates short of the open top of the housing 32. The upper end of the housing being open permits a free passage of air. A cylindrical sleeve 34 of considerably larger diameter than the conduit surrounds the conduit and rests upon a horizontal partition 34' forming the bottom of an annular chamber 35 located between the sleeve and the cylindrical wall of the housing above said partition. The sleeve 34 carries a collar 31' at its upper end whereby the conduit is suspended within the housing.

A cylindrical dome or bell 36 is disposed in the housing around the sleeve so as to trap air above the water level as is common in devices of this character. A guide stem 37 having its upper end fastened to the underside of the top of the bell extends downwardly through guide spiders 33 mounted in the conduit, whereby the bell is guided in its vertical movements. The lower end of the conduit 31 is closed by a cap 37' so that the rod may engage said cap, thereby limiting the downward movement of the bell.

A horizontal rod 38 has one end fastened to the top of the bell and this rod has its other end bent downwardly to form a shank 39. The shank extends contiguous to the standard 18 of the frame and slides through guide brackets 40 mounted on said standard. When the bell moves vertically in the housing 32, the shank 39 is moved vertically through the brackets. The shank carries a suitable marking medium 41 which is arranged to engage the concentric circular lines A of the chart 22.

When the bell 36 is in a lowered position, the pointer 41 is resting on the innermost or smallest circle of the group A. At each respiration, a volume of air is taken in through the mask 23 and this air passes through the respiratory channels of the body. It is then expelled through the flexible conductor 29 and passes to the conduit 31 of the measuring chamber. This air escapes from the upper end of the conduit and enters beneath the top of the bell 36 and also enters the space between said bell and the annular partition 34. Since the lower end of the bell is submerged in the water in the annular chamber 35, it will be seen that the air is trapped between the casing and partition.

Because of the check valve 30', the air cannot back up in the conductor 29 and therefore, said air lifts the cylindrical bell 36, which raises the pointer 39 with relation to the chart 22, whereby the marking medium 41 carried by the shank moves vertically across the group of circular lines A. The circular lines are calibrated to denote the volume of air in cubic centimeters, and therefore, since the pointer moves correspondingly to the volume of air expelled at each respiration, it is obvious that this volume of air will be recorded on the chart.

For releasing the trapped air after each respiration, an outlet pipe 42 leads from the lower end of the conduit, being connected therein above the inlet 30. The other end of this pipe extends upwardly above the frame 19. A ball check valve 43 is secured to the upper end of this pipe 42 by a flexible connection 44. Normally, the connection holds the valve in the position shown in Figure 1 whereby the ball 45 rests on the valve seat 46 to close the upper end of the pipe. An operating rod 47 is connected with the cage 43' of the valve and when said rod is moved horizontally, the valve is tilted or moves to the position shown in dotted lines in Figure 1, through the medium of the flexible connection. When so tilted, the ball 45 is unseated to permit air to escape from the conduit 31 through the pipe 42. The release of this trapped air permits the cylindrical bell 36 to fall to its original position to move the shank 39 downwardly on the chart.

From the above, it will be seen that the pressure exerted on the patient or subject by the person applying artificial respiration is recorded on the chart 22 across the group B of circular lines, while the volume of air expelled by the subject is recorded on the lines A of said chart. For recording the number of respirations over a given period and also to record the volume of air over the same period, the chart 22 is fastened on the rotatable shaft of an ordinary clock mechanism 50, the details of which are not shown. This clock is mounted on an angular standard 50' having its base secured to the standard 18 and attached at mid-height to the frame 19. Thus, the chart will rotate at a predetermined speed and each group of circles may be divided by radially extending lines D into periods of time.

In applying the artificial respiration, the pressure exerted at each respiration is recorded on the chart, and since the speed of rotation of said chart is fixed, the length of each respiration is recorded. At the same time the volume of air expelled from the body of the subject at each respiration is recorded on the chart. It is noted that the rod 47 must be pulled after each respiration so as to release the trapped air in the measuring chamber to permit the bell 36 to fall and return the shank 39 to its original position.

This device is not only adapted to be employed in reviving drowned persons, or in other actual cases, but is also adaptable for use in instruction work. When used in actual cases, it is apparent that the visible chart showing the results permits several persons to work on the patient and attain the same results by applying an equal pressure, equal number of respirations over a given period of time, etc. When the apparatus is used for instruction the pupil may observe the chart and thus, he can be taught to apply the proper pressure and thereby become proficient in obtaining the best results; however, when the device is used for the examination of persons qualifying for certificates entitling them to administer artificial respiration, the chart may be covered or any other means employed to prevent the applicant from observing the movements of the recording device. It is pointed out that the method may be carried out in various ways and if desired, the step of recording the pressure applied to the body could be eliminated. In this connection, the body of the person being worked upon might be placed upon the floor and the volume of the air expelled from the body when pressure was applied could be recorded at each respiration, and also the duration of each respiration could be recorded.

What I claim and desire to secure by Letters Patent is:

1. Apparatus for use in administering artificial respiration by the periodic application of pressure by the hands of an operator to the prone body of a patient, and comprising a vertically yieldable support for said body, a chart, means associated with the chart and periodically actuated by the downward movement of the support caused by the application of said pressure to said body for indicating on said chart the amount of pressure at each application, means for moving the chart past said indicating means at a predetermined speed whereby the number of respirations during a given period of time are indicated, a conduit adapted to be so connected to the patient's face that air expelled from his lungs during each application of said pressure passes therethrough, and means associated with said conduit for indicating the volume of air expelled therethrough from the patient's lungs during each forced respiration.

2. Apparatus for use in administering artificial respiration by the periodic application of pressure by the hands of an operator to the prone body of a patient, and comprising a vertically yieldable support for said body, a dial-like chart, means associated with the chart and periodically actuated by the downward movement of the support caused by the application of said pressure to said body for indicating on said chart the amount of pressure at each application, means for rotating the chart at a predetermined speed whereby the number of respirations during a given period of time are indicated, a conduit adapted to be so connected to the patient's face that air expelled from his lungs during each application of said pressure passes therethrough, and means associated with said conduit for indicating the volume of air expelled therethrough from the patient's lungs during each forced respiration.

3. Apparatus for use in administering artificial respiration by the periodic application of pressure by the hands of an operator to the prone body of a patient, and comprising a vertically yieldable support for said body, a chart, means associated with the chart and periodically actuated by the downward movement of the support caused by the application of said pressure to said body for indicating on said chart the amount of pressure at each application, a mask adapted to be fitted over the patient's nose and mouth and provided with an inwardly opening check valve for inhalation, an exhalation conduit opening at one end into said mask, means associated with the opposite end of the conduit for indicating on said chart the volume of air expelled through the conduit from the patient's lungs during each forced respiration, and means for moving the chart past said indicating means.

4. Apparatus for use in administering artificial respiration by the periodic application of pressure by the hands of an operator to the prone body of a patient, and comprising a vertically yieldable support for said body, a chart, means associated with the chart and periodically actuated by the downward movement of the support caused by the application of said pressure to said body for indicating on said chart the amount of pressure at each application, a conduit adapted to be so connected to the patient's face that air expelled from his lungs during each application of said pressure passes therethrough, means receiving said expelled air from the conduit and displaceable an amount corresponding to the volume of said air, means actuated by the displacement of said air-receiving means for indicating on said chart the volume of air expelled from the patient's lungs during each forced respiration, and means for moving the chart past said indicating means.

5. Apparatus for use in administering artificial respiration by the periodic application of pressure by the hands of an operator to the prone body of a patient, and comprising a vertically yieldable support for said body, a chart, means associated with the chart and periodically actuated by the downward movement of the support caused by the application of said pressure to said body for indicating on said chart the amount of pressure at each application, a conduit adapted to be so connected to the patient's face that air expelled from his lungs during each application of said pressure passes therethrough, means receiving said expelled air from the conduit and displaceable an amount corresponding to the volume of said air, and means associated with said chart and periodically actuated by the displacement of said air-receiving means for indicating on said chart said volume of air simultaneously with the indication of said pressure on the chart.

6. Apparatus for use in administering artificial respiriation by the periodic application of pressure by the hands of an operator to the prone body of a patient, and comprising a vertically yieldable support for said body, a chart, means for rotating the chart at a predetermined speed, means associated with the chart and periodically actuated by the downward movement of the support caused by the application of said pressure to said body for indicating on said chart the amount of pressure at each application, a conduit adapted to be so connected to the patient's face that air expelled from his lungs during each application of said pressure passes therethrough, means receiving said expelled air from the conduit and displaceable an amount corresponding to the volume of said air, manually operable means for releasing said air from said air-receiving means, and means actuated by the displacement of said air-receiving means for indicating on said chart the volume of air expelled from the patient's lungs during each forced respiration.

7. Apparatus for use in administering artificial respiration by the periodic application of pressure by the hands of an operator to the prone body of a patient, and comprising a vertically yieldable support for said body, a chart, means associated with the chart and periodically actuated by the downward movement of the support caused by the application of said pressure to said body for indicating on said chart the amount of pressure at each application, a conduit adapted to be so connected to the patient's face that air expelled from his lungs during each application of said pressure passes therethrough, a floating inverted receptacle for receiving said expelled air from the conduit and adapted to be raised by said air, and means associated with said chart and connected to said receptacle for indicating on the chart the volume of expelled air periodically received by the receptacle from the conduit.

8. Apparatus for use in administering artificial respiration by the periodic application of pressure by the hands of an operator to the prone body of a patient, and comprising a platform adapted to support said body, springs yieldably supporting the platform, a chart, an indicator associated with the chart, a lever engaging the bottom of said platform and adapted to be periodically depressed thereby when said pressure is applied to said body on the platform, means operably connecting said lever and indicator whereby the amount of said pressure at each application thereof is indicated on said chart, a conduit adapted to be so connected to the patient's face that air expelled from his lungs during each application of said pressure passes therethrough, means associated with said conduit for indicating on said chart the volume of air expelled therethrough from the patient's lungs during each forced respiration, and means for moving said chart past said indicating means.

CLARENCE I. LANGDON.